(12) United States Patent
Lipsitt

(10) Patent No.: US 11,399,548 B2
(45) Date of Patent: Aug. 2, 2022

(54) ANIMAL PELT REMOVAL

(71) Applicant: Transhumance Holding Company, Inc., Sacramento, CA (US)

(72) Inventor: David Charles Lipsitt, Sacramento, CA (US)

(73) Assignee: Transhumance Holding Company, Inc., Sacramento, CA (US)

( * ) Notice: Subject to any disclaimer, the term of this patent is extended or adjusted under 35 U.S.C. 154(b) by 468 days.

(21) Appl. No.: 16/599,765

(22) Filed: Oct. 11, 2019

(65) Prior Publication Data

US 2021/0106015 A1 Apr. 15, 2021

(51) Int. Cl.
*A22B 5/00* (2006.01)
*A22B 5/16* (2006.01)
*B25J 18/00* (2006.01)
*B25J 15/00* (2006.01)

(52) U.S. Cl.
CPC .......... *A22B 5/161* (2013.01); *B25J 15/0028* (2013.01); *B25J 18/007* (2013.01)

(58) Field of Classification Search
CPC .......... A22B 5/00; A22B 5/161; B25J 18/007; B25J 11/0045
USPC ................................................. 452/125, 129
See application file for complete search history.

(56) References Cited

U.S. PATENT DOCUMENTS

| 5,167,569 | A | * | 12/1992 | Davis | A22B 5/161 |
| | | | | | 452/187 |
| 5,195,923 | A | * | 3/1993 | Rankin | A22B 5/206 |
| | | | | | 452/63 |
| 5,562,534 | A | * | 10/1996 | McGough | A22B 5/06 |
| | | | | | 452/187 |
| 7,588,487 | B1 | * | 9/2009 | Born, Jr. | A22B 5/168 |
| | | | | | 452/132 |
| 8,574,042 | B1 | * | 11/2013 | Sloan | A22B 5/161 |
| | | | | | 452/128 |

* cited by examiner

*Primary Examiner* — Richard T Price, Jr.
(74) *Attorney, Agent, or Firm* — Schwegman Lundberg & Woessner, P.A.

(57) ABSTRACT

An end effector of a pelt removal apparatus has a rotatable effector base on which is mounted a pair of elongated gripper bars parallel to a rotation axis of the effector base. One of the gripper bars is fixed in position, while the other one is radially spaced from and freely pivotal about a pivot axis parallel to rotation axis. When rotated in a tightening direction from a start position in which the pelt is located in a transverse gap between the gripper bars, the free gripper bar moves, without dedicated actuation of the free gripper bar, to pinch the pelt between the bars, thus gripping the pelt and allowing removal thereof by the pelt removal apparatus.

20 Claims, 7 Drawing Sheets

ANIMAL PELT REMOVAL

BACKGROUND

The slaughtering and processing of animals (whether for lamb, beef, pork, or the like) includes removal of the animal pelt from a worked-up carcass. Often, the pelt is removed by pulling or stripping the pelt from the carcass using a driven mechanism.

In view of high throughput in animal processing facilities, it is of significant economic importance to minimize delays and maximize reliability of the pelt pulling process. A particularly problematic step in the pelt pulling process is quickly and reliably establishing a firm connection or grip on the pelt by the pulling mechanism.

BRIEF SUMMARY

One aspect of the disclosure provides an end effector or gripping mechanism incorporated in a pelt removal apparatus (e.g., an industrial robot on which the end effector is mounted) to firmly grip an animal pelt in an automated operation, thereby to enable pulling of the pelt from its carcass by actuated movement of the end effector.

The end effector has a rotatable effector base on which is mounted a pair of elongated gripper bars that in operation extend substantially horizontally, parallel to a rotation axis of the effector base. The pair of gripper bars define between them a horizontally extending transverse gap in which a free part of the animal pelt is received. One of the gripper bars is fixed in position relative to the effector base (also referred to herein as the fixed gripper bar or the fixed finger), while the other one of the gripper bars (also referred to herein as the free gripper bar or, in some embodiments, the swinging finger) is mounted for non-actuated or free movement relative to the effector base in response to rotation of the effector base. In some embodiments, the free gripper bar is mounted on the effector base to hang freely from a pivot axis parallel to the rotation axis, the free gripper bar being radially spaced from the pivot axis by a link bar that extends radially from the pivot axis, and being pivotally connected to the pivot axis. The free gripper bar is in such embodiments thus freely pivotable or arcuately displaceable about the pivot axis.

The effector base is configured such that, when rotated in a first, tightening direction from a start position in which the pelt is located in the transverse gap between the gripper bars, the free gripper bar moves, without dedicated actuation of the free gripper bar, towards the fixed gripper bar, closing the transverse gap.

Further rotation of the effector base causes part of the pelt to be pinched between the gripper bars. In some embodiments, gripping of the pelt by the gripper bars is facilitated by exertion on the free gripper bar of a tensile force via the pelt being pulled, the tensile force urging the free gripper bar forcefully against the fixed gripper bar, thus gripping the pelt to enable stripping of the pelt from the carcass by actuated translation of the end effector.

Further aspects of the disclosure include a pelt pulling apparatus that includes such an end effector, and a method for removing an animal pelt using the disclosed techniques.

The foregoing is a brief introduction to some aspects of the disclosure. Further details and aspects of the disclosed techniques are discussed with respect to the example embodiments in the description that follows.

BRIEF DESCRIPTION OF THE SEVERAL VIEWS OF THE DRAWINGS

The appended drawings merely illustrate example embodiments of the present disclosure and cannot be considered as limiting its scope. To facilitate collation of numbered items in the description to the drawings, the first digit of each numbered item corresponds to the figure in which that item first appears. In the drawings.

DETAILED DESCRIPTION

The description that follows includes apparatuses, devices, systems, methods, and techniques that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known structures, devices, and techniques are not necessarily shown in detail.

Figure 1:
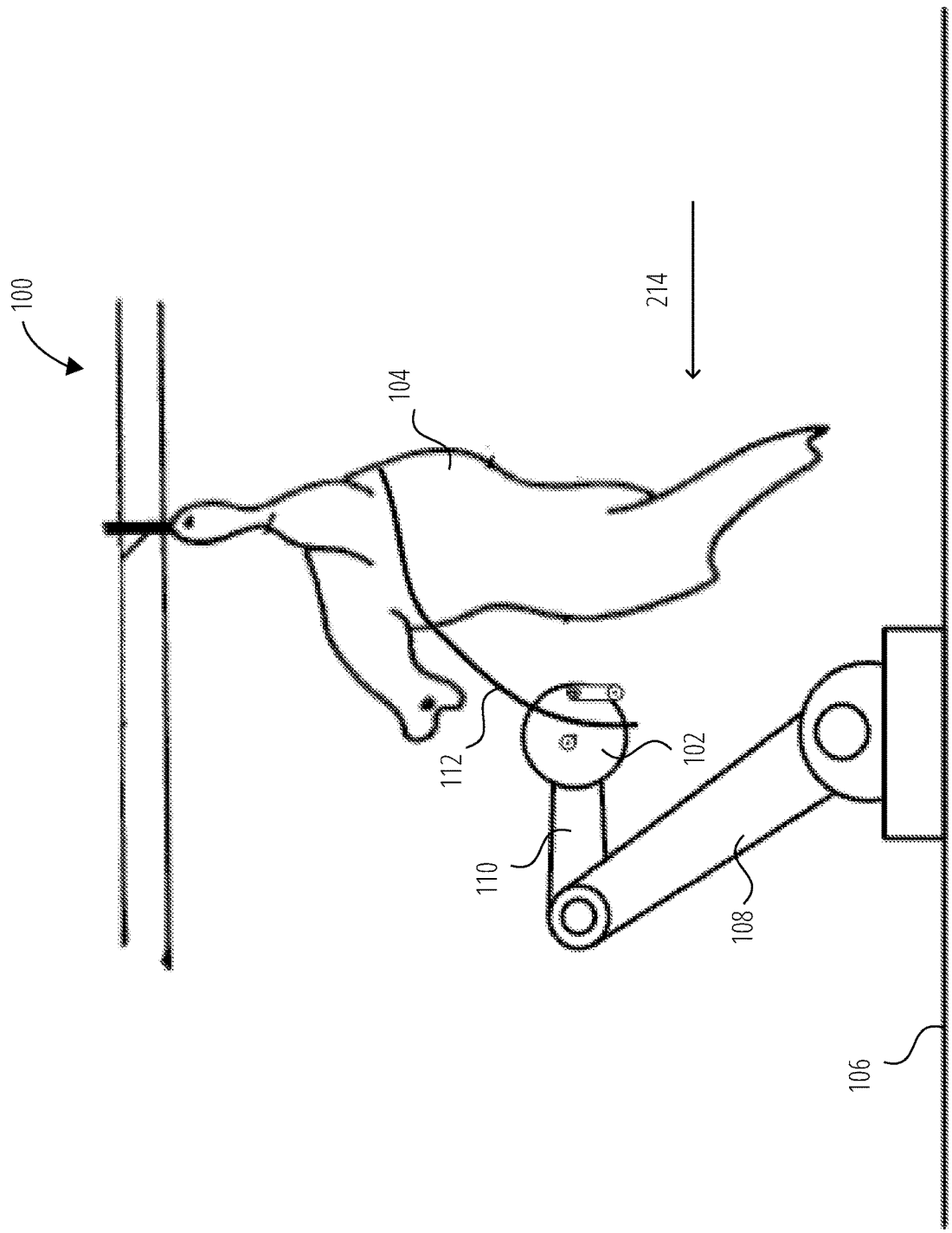
FIG. 1 is a schematic side view of an animal processing facility that includes a pelt puller apparatus provided with an end effector configured for automated gripping of a pelt, according to one example embodiment.

FIG. 1 shows a schematic side view of a facility 100 for processing animal carcasses, which processing includes, amongst other operations, removing animal pelts from the carcasses, also referred to herein as pelt pulling. The workstation illustrated in FIG. 1 is set up for such a pelt pulling operation.

To this end, a worked-up carcass 104 (in this example embodiment, a sheep carcass) is suspended from an overhead conveyor system (not shown) which feeds the preprepared carcass 104 to the workstation. As can be seen in FIG. 1, the carcass 104 is hung upside down, with a flap or length of the animal's pelt 112 having been slit and stripped from the carcass 104 and hanging down vertically to allow gripping thereof for forcefully pulling the remainder of the pelt 112 from the carcass 104.

The pelt pulling workstation of the facility 100 comprises a pelt puller apparatus in the example form of an articulated industrial robot 108. A body of the robot 108 thus includes, in conventional fashion, an actuated member in the form of an articulated robot arm 110 capable of controlled driven movement. An end effector 102 is mounted at the distal end of robot arm 110. The end effector 102 is in this example embodiment configured for automated gripping or catching hold of the hanging end of the pelt 112, to enable pulling of the pelt 112 from the carcass 104 by actuated movement of the robot arm 110. The robot 108 and end effector 102 are configured such that the end effector has six degrees of freedom.

Figure 2:
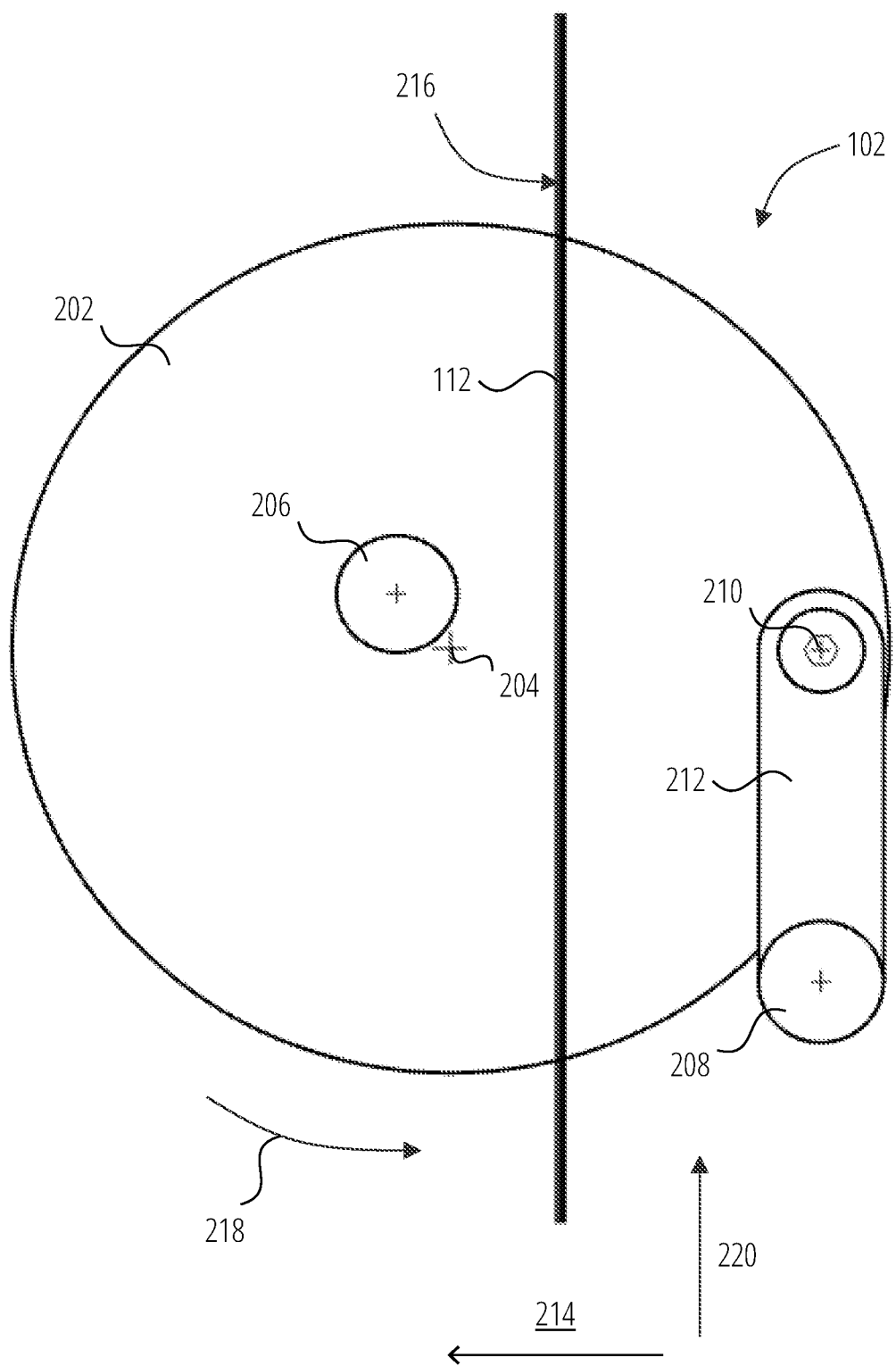
FIG. 2 shows, on an enlarged scale, a schematic end view of an end effector for forming part of a pelt puller apparatus such as that of FIG. 1, according to one example embodiment, the end effector is shown in a start position to grip an animal pelt for pulling it from an animal carcass suspended above the end effector.
Figure 3:
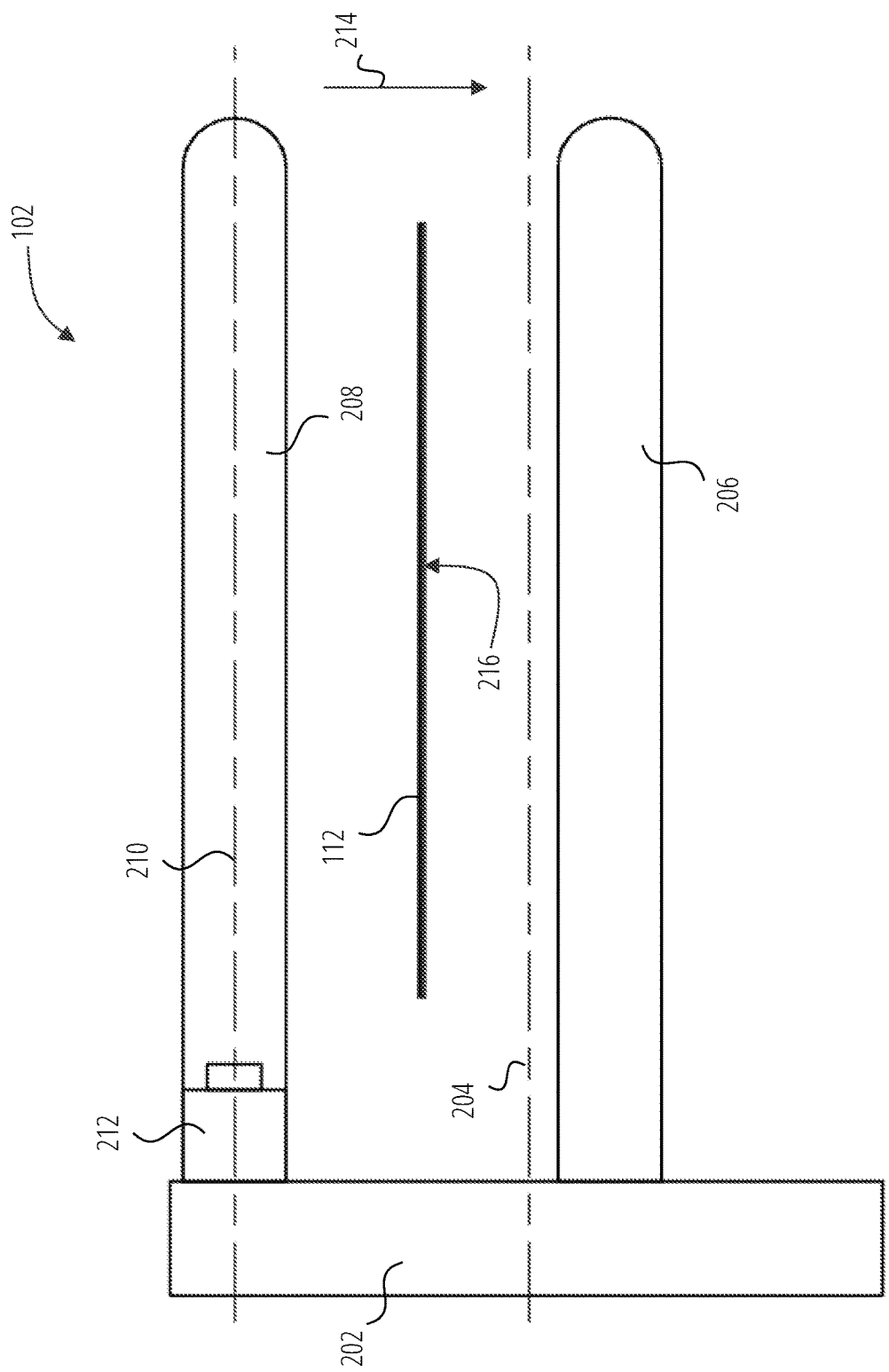
FIG. 3 shows a schematic top view of the end effector of FIG. 2, according to the example embodiment.

FIG. 2 shows an end view of the end effector 102 in greater detail, with FIG. 3 showing the end effector 102 in top view and in the same configuration and rotational position as in FIG. 2. The end effector 102 comprises a rotatable effector base in the form of a baseplate 202 that is mounted on the robot arm 110 to be drivingly rotatable relative to the robot arm 110 about a rotation axis 204. In this example embodiment, the baseplate 202 is disc-shaped and is in operation oriented substantially vertically, so that the rotation axis 204 extends substantially horizontally. When the end effector 102 is in a start position (as shown in FIG. 2 and FIG. 3) the rotation axis 204 extends parallel to the loose end of the pelt 112 that is to be gripped by the end effector 102. The circular end face of the baseplate 202 directed to the pelt 112 is thus oriented transversely to the pelt 112.

The baseplate 202 has mounted thereon a pair of gripper bars that project perpendicularly away from the baseplate 202 to entangle between them the pelt 112 responsive to rotation of the baseplate 202 in a tightening direction 218, thus gripping the pelt 112. One of the gripper bars is a fixed gripper bar that has a fixed radial and angular position relative to the baseplate 202. The other gripper bar is a free gripper bar that is movable under gravity responsive to rotation of the baseplate 202 from the start position, thereby to close a transverse gap between the gripper bars within which the pelt 112 is located, enabling entanglement of the pelt 112 with the pair of gripper bars. In this example embodiment, the fixed gripper bar is provided by a fixed finger 206 mounted eccentrically to the rotation axis 204 and projecting from the baseplate 202 substantially parallel to the rotation axis 204. The fixed finger 206 is in this example embodiment a circular cylindrical steel bar with a rounded distal end (see FIG. 3). The fixed finger 206 has a diameter of between 19 and 80 mm, in this example embodiment having a diameter of about 51 mm. The length of the fixed finger 206 is between 250 and 800 mm, and may be varied depending on the type of animal to be processed. In this example embodiment, the length of the fixed finger 206 is about 500 mm.

The free gripper bar is in this example embodiment provided by a swinging finger 208 that is suspended from the baseplate 202 via a vertically oriented link bar 212. The swinging finger 208 is located at a distal end of the link bar 212, being oriented substantially parallel to and transversely spaced from the fixed finger 206. The opposite, proximal end of the link bar 212 is mounted on the baseplate 202 by a pivot pin such that the link bar 212 (and therefore the swinging finger 208) hangs freely from a pivot axis 210 defined by the pivot pin. The pivot axis 210 is parallel to the rotation axis 204, and is in this example embodiment located adjacent the radially outer periphery of the baseplate 202. Note that the pivot axis 210 in this example embodiment thus has a greater radial spacing from the rotation axis 204 than the fixed finger 206. It will be appreciated that the swinging finger 208 is thus arcuately displaceable relative to the pivot axis 210, in that the possible loci of a longitudinal axis of the swinging finger 208 describes a partial circle about the pivot axis 210.

As mentioned, the swinging finger 208 hangs freely from the pivot axis 210, by which is meant that there is substantially no torque transfer between the baseplate 202 and the link bar 212. Due to the weight of the link bar 212 and the swinging finger 208 (which is identical in shape, size, and material construction to the fixed finger 206 described above), the swinging finger 208 is in the start position shown in FIG. 2 in vertical alignment with the pivot axis 210, and maintains this vertical alignment responsive to rotation of the baseplate 202, until the swinging finger 208 is brought into contact with the pelt 112 or with the fixed finger 206.

Note that the transverse spacing between (a) the pivot axis 210 and the longitudinal axis of the swinging finger 208, and (b) the pivot axis 210 and the longitudinal axis of the fixed finger 206 is such that pivotal displacement of the swinging finger 208 past the fixed finger 206 is prevented by the swinging finger 208 fouling on the fixed finger 206. As can best be seen in FIG. 4, the radial spacing of the swinging finger 208 from the pivot axis 210 is in this example embodiment somewhat smaller than the radial spacing (relative to the pivot axis 210) of the fixed finger 206. The difference between these two spacings, however, is smaller than the diameter of the fingers 206, 208, so that the radially outer periphery is of the respective fingers 206, 208 are brought into oblique contact responsive to sufficient rotation of the baseplate 202 in the tightening direction 218. Such oblique approach of the swinging finger 208 to the fixed finger 206 facilitates reliable grouping of the pelt 112 by the gripping mechanism provided by the end effector 102.

In the start position illustrated in FIG. 2, the fixed finger 206 and the swinging finger 208 thus define between them a transverse, horizontal gap within which the loose end of the pelt 112 is partially located before rotation of the baseplate 202 commences. Note that an inner side 210 of the pelt 112 (i.e., that side of the pelt which is torn from the carcass 104, the opposite side of the pelt 112 bearing fur or wool) faces towards the swinging finger 208.

In FIG. 2, which shows the end effector 102 in the start position, arrow 220 indicates a vertical insertion direction in which the end effector 102 is moved by the robot arm 110 to receive the pelt 112 in the horizontal gap between the fingers 206, 208. The end effector 102 is thus initially located in a lowered position below the start position shown in FIG. 3, being clear of a lower end of the pelt 112 which is moved in a horizontal feed direction 214 in which the pelt 112 is moved by the overhead conveyance system of the facility 100. The pelt is moved in the feed direction 214 into a position in which it is in register (i.e., directly above) the transverse gap between the fingers 206, 208. Thereafter, robot arm 110 moves the end effector 102 upwards in the insertion direction 220, inserting the pelt 112 into the gap, thereby bringing the pelt 112 and the end effector 102 into the start position shown in FIG. 2 and FIG. 3. Note that the end effector 102 can in other embodiments be moved into the start position horizontally.

The baseplate 202 is rotated in the tightening direction 218 from the start position of the FIG. 2 to capture the pelt 112 by engagement with the fingers 206, 208. FIGS. 4-7 show progressive stages in the gripping of the pelt 112 by the end effector 102 resulting from automatic driven rotation of the baseplate 202 about the rotation axis 204.

Figure 4:
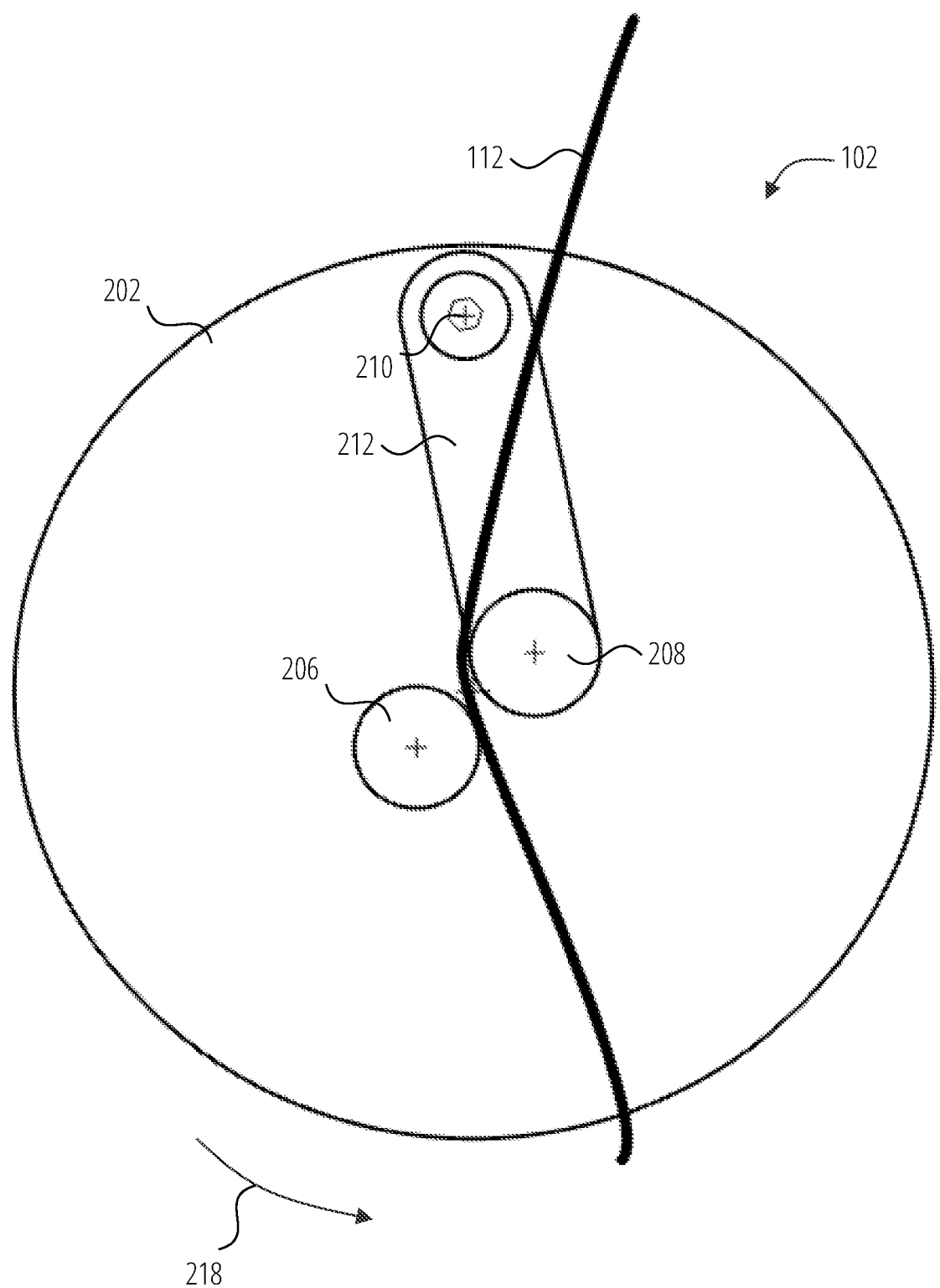
FIG. 4 shows a view corresponding to FIG. 2, the end effector having been rotated in a tightening direction from its start position to engage the pelt located between its gripper fingers, according to one example embodiment.
Figure 5:
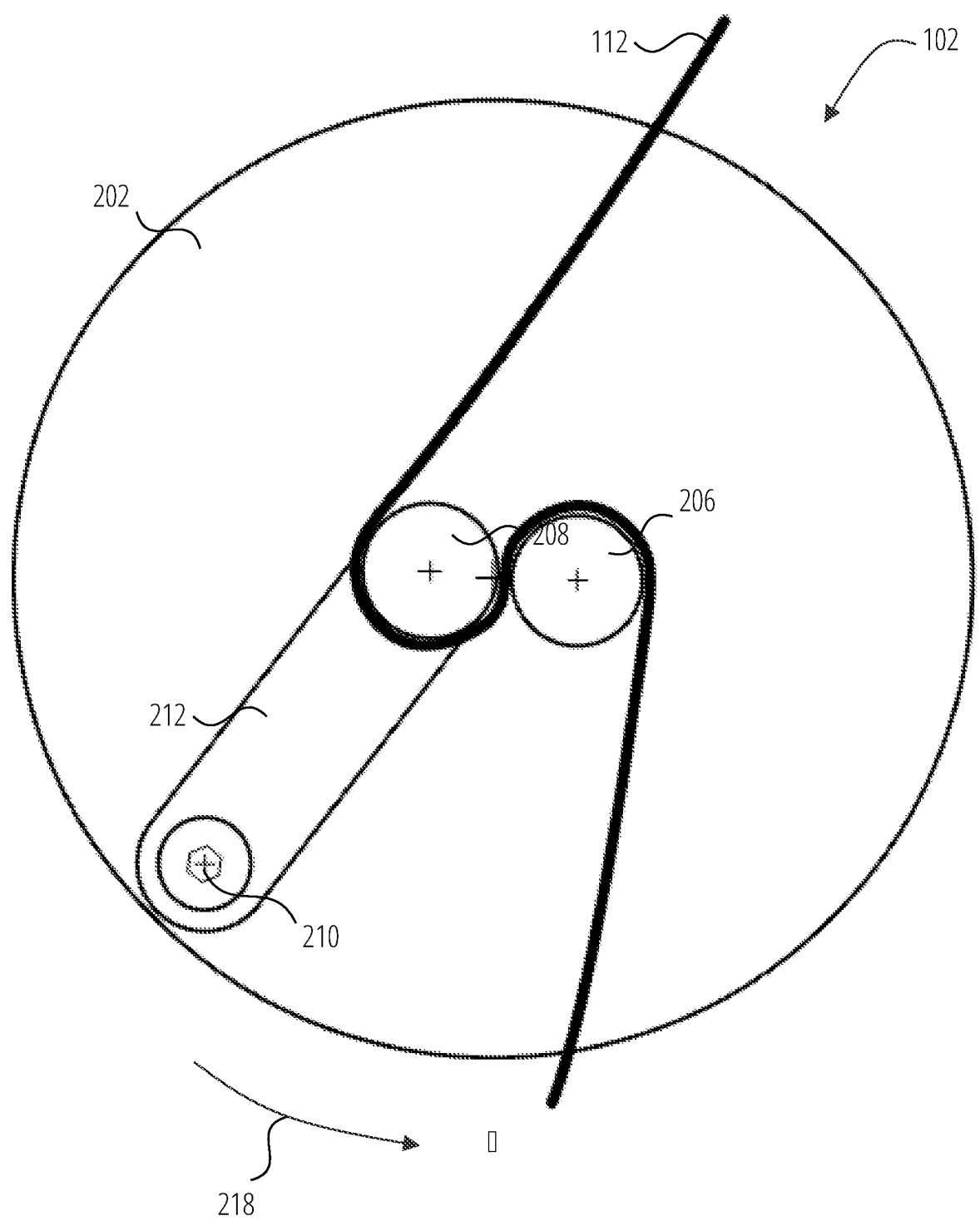
FIG. 5 shows a view corresponding to FIG. 4, following further rotation of the end effector in the tightening direction.
Figure 6:
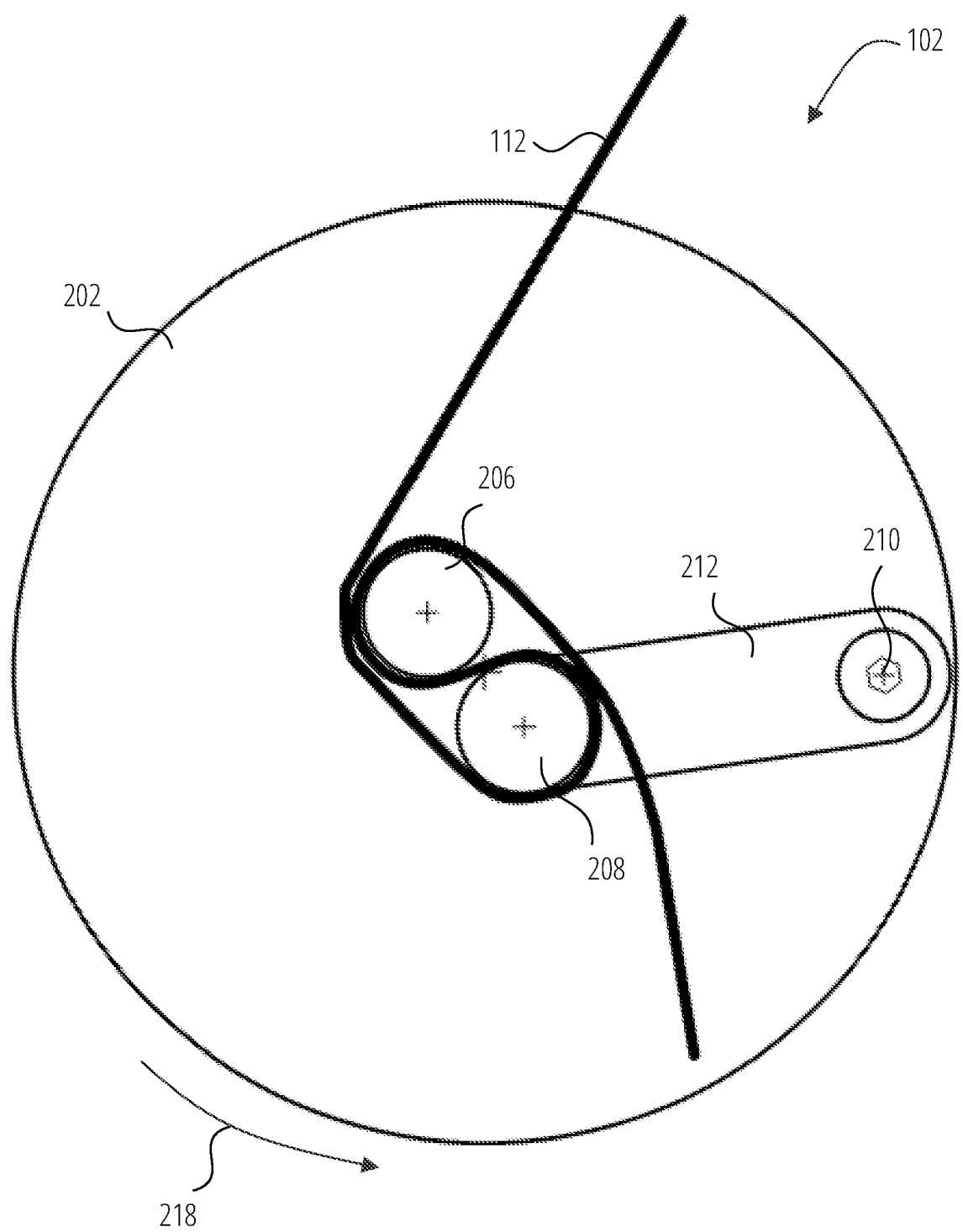
FIG. 6 shows a view corresponding to FIG. 5, following further rotation of the end effector in the tightening direction.

Initially, as discussed, the link bar 212 bar maintains a vertical orientation, so that the swinging finger 208 maintains its vertical alignment with the pivot axis 210. The transverse gap between the fingers 206, 208 is thus progressively closed. FIG. 4 shows a rotation stage in which the swinging finger 208 is brought into close contact with the fixed finger 206, capturing a part of the pelt 112 between them. It will be noted that at the rotation stage of FIG. 4, the link bar 212 has already been pulled out of the vertical due to engagement of the swinging finger 208 with the pelt 112, dragging the pelt towards the fixed finger 206.

Further rotation in the tightening direction 218 wraps the pelt 112 circumferentially about the radially outer periphery of the swinging finger 208, while the pelt 112 is likewise draped circumferentially over the fixed finger 206. Note that the pelt 112 is forcefully pulled from the carcass 104 due to the driven rotation of the baseplate 202, so that the pelt 112 exerts a tensile force tangential to the radially outer periphery of the swinging finger 208. Due to the spatial arrangement of the different parts of the end effector 102, and the orientation of the tightening direction, the pelt 112 thus effectively pulls the swinging finger 208 tightly against the fixed finger 206. In this manner, the pelt 112 is tightly gripped between the swinging finger 208 and the fixed finger 206, without any actuation or driven movement of any part of the end effector 102 other than rotation of the baseplate 202. Differently worded, torque applied by the robot arm 110 to the baseplate 202 is employed by the end effector 102 to tightly gripped the pelt 112 between the swinging finger 208 and the fixed finger 206 without use of a separate actuating mechanism to bring the fingers 206, 208 together and to press them against one another for gripping the pelt 112.

Moreover, continued exertion of tensile force by the pelt 112 on the swinging finger 208 maintains the swinging finger 208 in tight abutment with the fixed finger 206 even when the link bar 212 goes past the vertical so that the swinging finger 208 would otherwise fall away from the fixed finger 206 under gravity. Thus, in FIG. 6, for example, it can be seen that the swinging finger 208 continues to be to pulled tightly against the fixed finger 206 even after a full rotation of the baseplate 202.

Note that the robot arm 110 may in some embodiments be configured to cooperate with rotation of the baseplate 202 to maintain sufficient tensile force in the pulled pelt 112. To this end, the robot arm 110 may in some embodiments move at least somewhat downwards and/or further in the feed direction 214 during the rotation of the baseplate 202 as described with reference to FIGS. 2-7.

Figure 7:
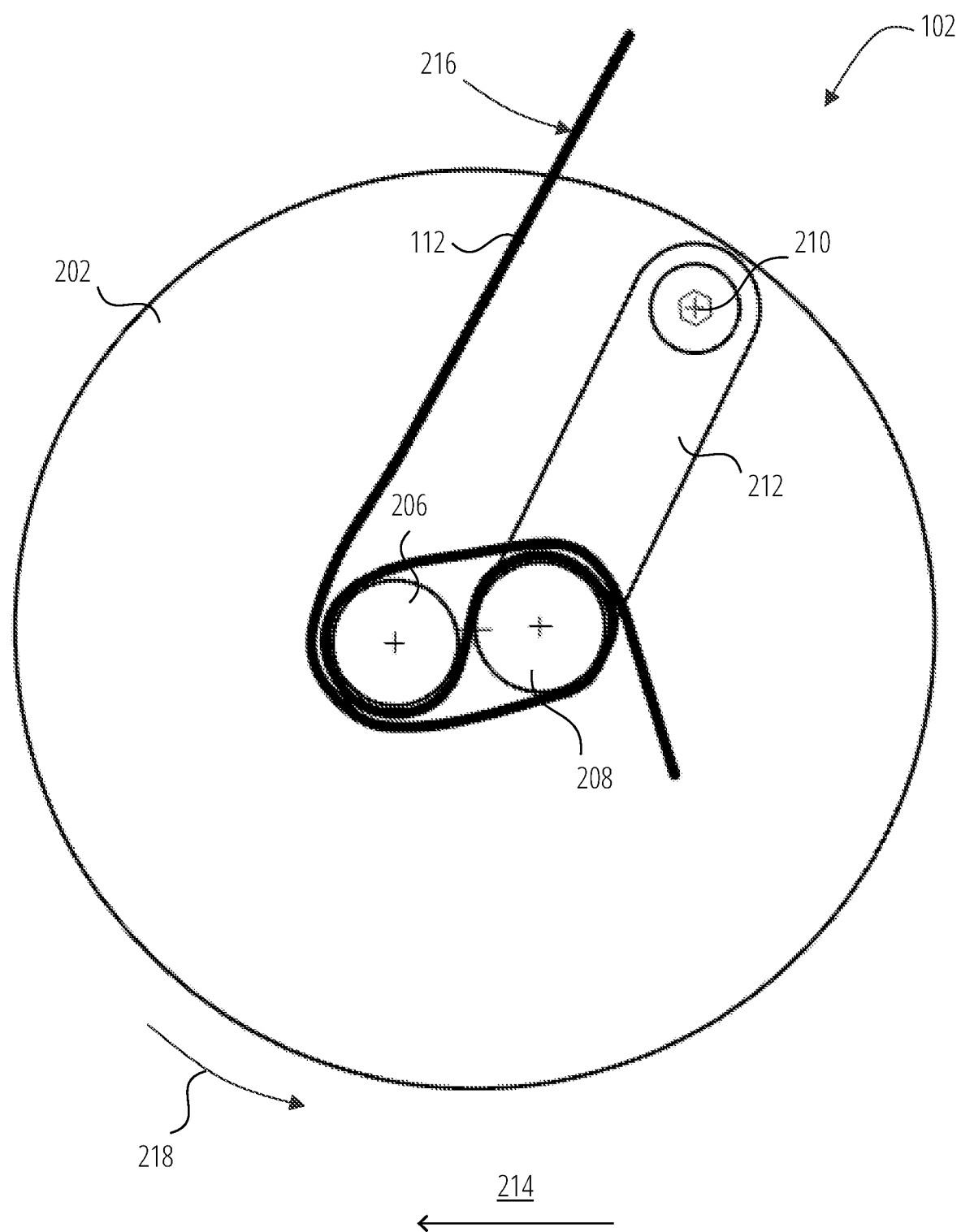
FIG. 7 shows a view corresponding to FIG. 6, following yet further rotation of the end effector in the tightening direction, so that the pelt is securely gripped by the end effector to allow removal of the pelt from the animal carcass by actuated movement of the pelt puller, according to one example embodiment.

FIG. 7 shows the end effector 102 in a final rotational position (in this example embodiment), in which the swinging finger 208 continues to be held tightly against the fixed finger 206, continuing to trap the pelt 112 between them, with the pelt 112 being wrapped at least once around the combination of fingers 206, 208. In this condition, the pelt 112 is firmly gripped by the end effector 102.

The robot arm 110 thereafter pulls the remainder of the pelt 112 from the carcass 104 by driven movement of the end effector 102 downwards and/or in the feed direction 214, thus moving the end effector 102 further away from the hanging carcass 104. In this example embodiment, the robot arm 110 pivots about a horizontal axis to move the end effector 102 downwards in an arc. During such movement, the end effector 102 is automatically maintained in the described orientation in which the rotation axis 204 and gripping fingers 206, 208 extend substantially horizontally and transverse to the feed direction 214.

In some embodiments, the end effector 102 is rotated further than the rotational stage shown in FIG. 7. In some embodiments, the end effector 102 is continuously or intermittently further rotated in the tightening direction 218 during pulling of the pelt 112 by actuated movement of the robot arm 110.

After the pelt 112 is thus fully pulled from the carcass 104, the baseplate 202 is rotated in an unwinding direction opposite to the tightening direction 218. The pelt 112 is thereby unspooled or unwound from the gripping fingers 206, 208. Such unwinding rotation causes pivotal movement of the swinging finger 208 away from the fixed finger 206, releasing the pelt 112 and allowing the pelt 112 to fall from the end effector 102. Thereafter, the next carcass 104 in line is moved into register with the end effector 102, and the previously described process is repeated.

It is a benefit of the disclosed techniques that gripping of the pelt 112 by the end effector 102 is more reliable and effective than existing techniques. This despite the relatively simple construction of the end effector 102, which has no actuated moving parts. The sole moving components of the end effector 102 is the swinging finger 208 and the link bar 212 by which it is suspended from the baseplate 202. This pivotal connection is a conventional frictionless rotational mounting, e.g. by reception of a pivot pin in a roller bearing. Accordingly, the end effector 102 is highly reliable, requiring little to no maintenance, and is not susceptible to mechanical malfunction.

Despite this simplicity and reliability, gripping of the pelt 112 is in fact superior to mechanisms in which an actuated gripping element is provided on the end effector. As described above, the power and torque applied to the baseplate 202 is in effect used (via tensile forces exerted by the pulled pelt 112) to pinch the pelt 112 between the swinging finger 208 and the fixed finger 206. Because the available torque and power of a motor which drives rotation of the baseplate 202 is typically substantially greater than that of a dedicated motor or drive system to separately actuate a gripping element on some existing gripping devices, the end effector 102 grips the pelt 112 more tightly and reliably than is the case for such existing devices.

Language

"Actuated movement of an element forming part of a device or apparatus" refers to means movement impelled by an actuator, motor, or drive system incorporated in the device or apparatus of which the actuated element forms part. In contrast, non-actuated movement means movement impelled or caused by forces external to the device or apparatus of which the relevant element forms part.

"Arcuate movement or arcuate displacement" refers to means movement or displacement along an arc relative to an associated axis, all loci along the arc being located at a constant radius from the associated axis. Differently defined, an arc means a part of a circle.

"Fixed mounting or fixed attachment" refers to when used to describe the mounting of one element on another means that the mounted element has a fixed location relative to the element on which is mounted, so the translation between the elements are prevented, but it does not mean that the elements are necessarily rotationally fast with one another. Thus, a bar fixedly mounted on and projecting from a base member is necessarily fast with the base member for movement therewith, but may be rotatable relative to the base member about a lengthwise axis of the bar.

"Operatively" refers to in use, when the apparatus is employed to grip and pull an animal pelt hanging more or less vertically from an animal carcass, the end effector being oriented so that the rotation axis of the effector base extends substantially horizontally.

"Substantially" refers to means "for the most part"; "essentially"; in substance. Thus, for example, description as two elements as being substantially parallel or co-planar include not only instances in which the elements are perfectly parallel or co-planar, but also includes instances in which the elements are almost, virtually, or practically parallel or co-planar.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An apparatus comprising:
   an apparatus body; and
   an end effector that is mounted on the apparatus body and that is configured for gripping an animal pelt to enable pulling of the pelt from an animal carcass, the end effector comprising:
   an effector base mounted on the apparatus body to be rotatable relative to the apparatus body about a rotation axis that operatively extends substantially horizontally;
   a fixed gripper bar that is fixedly mounted on the effector base, projecting therefrom substantially parallel to the rotation axis; and
   a free gripper bar mounted on the effector base to extend substantially parallel to and transversely spaced from the fixed gripper bar, the free gripper bar being suspended from the effector base to hang freely from a pivot axis substantially parallel to the free gripper bar, the free gripper bar being arcuately displaceable relative to the pivot axis, such that rotation of the effector base in a first direction causes reduction in a transverse gap between the fixed gripper bar and the free gripper bar, thereby in use to grip part of an animal pelt located in the transverse gap.

2. The apparatus of claim 1, wherein the free gripper bar has sufficient weight to cause the free gripper bar to maintain vertical alignment with the pivot axis responsive to initial rotation of the effector base in the first direction, the free gripper bar being arcuately displaced relative to the effector base under gravity owing to the free gripper bar hanging freely from the pivot axis.

3. The apparatus of claim 1, wherein the apparatus body comprises an actuated member on which the end effector is mounted, the actuated member being displaceable relative to a support surface on which the apparatus body is mounted, thereby to facilitate pulling from an associated animal carcass a pelt gripped by the end effector.

4. The apparatus of claim 3, wherein the apparatus is an industrial robot, the actuated member being provided by a robot arm on which the end effector is mounted.

5. The apparatus of claim 1, wherein the fixed gripper bar is eccentrically mounted on the effector base, being radially spaced from the rotation axis of the effector base.

6. The apparatus of claim 1, wherein the pivot axis of the free gripper bar is eccentrically located on the effector base, being radially spaced from the rotation axis of the effector base.

7. The apparatus of claim 1, wherein both the fixed gripper bar and the pivot axis of the free gripper bar are eccentric to the rotation axis of the effector base, being radially spaced from the rotation axis.

8. The apparatus of claim 7, wherein a radial spacing of the fixed gripper bar from the rotation axis is smaller than a radial spacing of the pivot axis from the rotation axis.

9. The apparatus of claim 1, wherein a spacing between the pivot axis and the fixed gripper bar is such that arcuate displacement of the free gripper bar about the pivot axis, absent any object located in the transverse gap between the free gripper bar and the fixed gripper bar, brings the free gripper bar into contact with the fixed gripper bar.

10. The apparatus of claim 1, wherein the free gripper bar and the fixed gripper bar are each provided by an elongated circular cylindrical finger.

11. The apparatus of claim 10, wherein each finger has a diameter of between one and two inches.

12. A device for gripping an animal pelt to enable pulling of the pelt from an animal carcass, the device including:
   a rotatable base mountable on an apparatus body to rotatable about a rotation axis that operatively extends substantially horizontally;

a fixed gripper bar that is fixedly mounted on the rotatable base and that projects therefrom substantially parallel to the rotation axis; and a free gripper bar mounted on the rotatable base for non-actuated movement of the free gripper bar relative to the rotatable base, the free gripper bar extending substantially parallel to the fixed gripper bar and being spaced therefrom by a transverse gap, the mounting and positioning of the free gripper bar being such that rotation of the rotatable base in a first direction causes part of an animal pelt located in the transverse gap to be pinched between the free gripper bar and the fixed gripper bar, thus gripping the animal pelt for pulling by movement of the rotatable base.

13. The device of claim 12, wherein the device has no drive mechanism configured for actuating movement of the free gripper bar.

14. The device of claim 12, wherein the mounting of the free gripper bar on the rotatable base is configured such that a tensile force exerted by the animal pelt responsive to rotation of the rotatable base by at least half a rotation from a start position in the first direction tends to urge the free gripper bar into lateral contact with the fixed gripper bar, thereby to pinch part of the animal pelt between the free gripper bar and the fixed gripper bar, the start position being a rotational position at which the transverse gap is largest in horizontal extent.

15. The device of claim 12, wherein the free gripper bar is suspended from the rotatable base to hang freely from a pivot axis substantially parallel to the free gripper bar, the free gripper bar being arcuately displaceable relative to the pivot axis.

16. The device of claim 15, wherein both the fixed gripper bar and the rotation axis of the free gripper bar are eccentric to the rotation axis of the rotatable base, being radially spaced from the rotation axis.

17. The device of claim 16, wherein a radial spacing of the fixed gripper bar from the rotation axis is smaller than a radial spacing of the pivot axis from the rotation axis, and wherein a radial spacing of the fixed gripper bar from the pivot axis is greater than a radial spacing of the free gripper bar from the pivot axis.

18. The device of claim 12, wherein the device is an end effector configured for mounting on an industrial robot to provide for actuated rotation and translation of the rotatable base.

19. A method comprising:

positioning an animal carcass such that part of a pelt to be pulled from the animal carcass is located in a horizontal gap defined by an end effector mounted on a pelt pulling apparatus, the end effector comprising:

an effector base mounted on the pelt pulling apparatus to be rotatable a rotation axis that is oriented substantially horizontally;

a fixed gripper bar that is fixedly mounted on the effector base, projecting therefrom substantially parallel to the rotation axis; and a free gripper bar mounted on the effector base for non-actuated movement of the free gripper bar relative to the effector base, the free gripper bar extending substantially parallel to the fixed gripper bar and being spaced therefrom such that the horizontal gap is defined between the free gripper bar and the fixed gripper bar;

rotating the effector base in a first direction that causes automatic movement of the free gripper bar under gravity towards the fixed gripper bar, so that the horizontal gap is closed and part of the animal pelt is pinched between the free gripper bar and the fixed gripper bar; and further rotating the effector base such that a tensile force between the pelt and the free gripper bar urges the free gripper bar against the fixed gripper bar, thus gripping the pelt to enable pulling of the pelt from the animal carcass by further actuated movement of the end effector.

20. The method of claim 19, wherein the free gripper bar is suspended from the effector base to hang freely from a pivot axis substantially parallel to the free gripper bar, the free gripper bar being arcuately displaceable relative to the pivot axis.

* * * * *